United States Patent
Jemander et al.

(10) Patent No.: US 10,349,032 B2
(45) Date of Patent: Jul. 9, 2019

(54) VEHICLE OCCUPANT HEAD POSITIONING SYSTEM

(71) Applicant: Veoneer US, Inc., Southfield, MI (US)

(72) Inventors: Thorbjorn Jemander, Linkoping (SE); Shane Murray, Boston, MA (US)

(73) Assignee: Veoneer US, Inc., Southfield, MI (US)

( * ) Notice: Subject to any disclaimer, the term of this patent is extended or adjusted under 35 U.S.C. 154(b) by 263 days.

(21) Appl. No.: 15/282,329

(22) Filed: Sep. 30, 2016

(65) Prior Publication Data
US 2018/0096475 A1 Apr. 5, 2018

(51) Int. Cl.
| | |
|---|---|
| G01S 15/02 | (2006.01) |
| H04N 13/106 | (2018.01) |
| H04N 7/18 | (2006.01) |
| H04N 5/33 | (2006.01) |
| G01S 13/58 | (2006.01) |
| G01S 13/86 | (2006.01) |
| G01S 15/58 | (2006.01) |
| B60K 28/06 | (2006.01) |
| G08B 21/06 | (2006.01) |
| G08B 29/18 | (2006.01) |
| G06T 7/70 | (2017.01) |
| B60W 40/08 | (2012.01) |

(52) U.S. Cl.
CPC ........... *H04N 13/106* (2018.05); *B60K 28/06* (2013.01); *G01S 13/582* (2013.01); *G01S 13/867* (2013.01); *G01S 15/025* (2013.01); *G01S 15/58* (2013.01); *G06T 7/70* (2017.01); *G08B 21/06* (2013.01); *G08B 29/188* (2013.01); *H04N 5/33* (2013.01); *H04N 7/183* (2013.01); *B60W 2040/0818* (2013.01); *G06T 2207/10028* (2013.01); *G06T 2207/30196* (2013.01)

(58) Field of Classification Search
CPC .......... G06T 7/004; G06T 2207/10028; G06T 2207/30196; G01S 15/58; G01S 15/025; G01S 13/582; G01S 13/867; B60R 22/48; B60R 1/00; B60R 2300/8006; B60N 2/002; H04N 13/106; H04N 7/183; H04N 5/33
See application file for complete search history.

(56) References Cited

U.S. PATENT DOCUMENTS

| | | | |
|---|---|---|---|
| 5,118,134 A | 6/1992 | Mattes et al. | |
| 5,653,462 A | 8/1997 | Breed et al. | |
| 5,835,613 A * | 11/1998 | Breed | B60J 10/00 |
| | | | 382/100 |
| 5,848,802 A | 12/1998 | Breed et al. | |
| 6,043,873 A * | 3/2000 | Ramer | G01S 5/16 |
| | | | 356/139.03 |

(Continued)

*Primary Examiner* — Jeremiah C Hallenbeck-Huber
(74) *Attorney, Agent, or Firm* — Burns & Levinson LLP; Steven M. Mills

(57) ABSTRACT

Described are occupant positioning systems, and methods of use thereof, which combine image capture and radar or ultrasonic sensors, determine the head position and/or velocity of a vehicle occupant's head in three dimensions for use in a driver monitoring application. The driver monitoring applications may include features such as driver drowsiness estimation and indication, driver attention monitoring, driver gaze direction and driver gaze positioning, driver identification, head-up display adjustment and automatic sun blocking. These are features that can improve the operational safety of the vehicle.

10 Claims, 17 Drawing Sheets

(56) References Cited

U.S. PATENT DOCUMENTS

| | | | | |
|---|---|---|---|---|
| 6,314,211 | B1* | 11/2001 | Kim | G06K 9/20 |
| | | | | 382/285 |
| 6,415,223 | B1* | 7/2002 | Lin | G01C 21/20 |
| | | | | 340/988 |
| 6,462,773 | B1* | 10/2002 | Koga | G01S 3/7864 |
| | | | | 348/143 |
| 6,507,779 | B2 | 1/2003 | Breed et al. | |
| 7,777,778 | B2 | 8/2010 | Scharenbroch et al. | |
| 8,049,658 | B1* | 11/2011 | Lagonik | G01C 21/005 |
| | | | | 342/118 |
| 8,102,417 | B2 | 1/2012 | Hammoud et al. | |
| 2002/0015048 | A1* | 2/2002 | Nister | G06T 15/20 |
| | | | | 345/625 |
| 2004/0247174 | A1* | 12/2004 | Lyons | G06F 3/04845 |
| | | | | 382/154 |
| 2007/0008340 | A1* | 1/2007 | Endo | G06T 19/006 |
| | | | | 345/633 |
| 2009/0105986 | A1* | 4/2009 | Staab | G01C 15/002 |
| | | | | 702/151 |
| 2009/0324018 | A1* | 12/2009 | Tell | G06K 9/00208 |
| | | | | 382/103 |
| 2011/0007139 | A1* | 1/2011 | Brunetti | G08B 13/19613 |
| | | | | 348/51 |
| 2012/0293635 | A1* | 11/2012 | Sharma | G06K 9/00234 |
| | | | | 348/50 |
| 2014/0368615 | A1* | 12/2014 | van Baar | G06T 7/0075 |
| | | | | 348/48 |
| 2016/0320476 | A1* | 11/2016 | Johnson | G06T 7/80 |

* cited by examiner

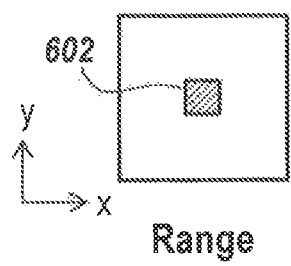
Fig. 6A — Range
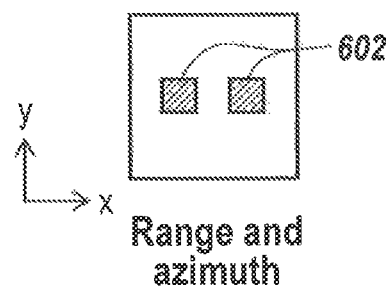
Fig. 6B — Range and azimuth
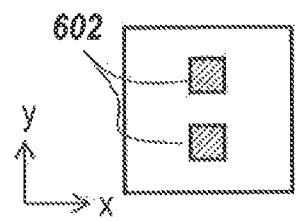
Fig. 6C — Range and elevation
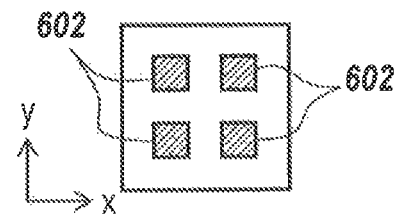
Fig. 6D — Range, azimuth and elevation ies only. The gaze direction and gaze position are dependent on the three dimensional position of the head. Errors made in the head position estimate propagate to errors in the gaze position and gaze direction. A camera-only approach, with various techniques, may provide an estimate of the z-position (i.e., roughly normal to the driver's face), but may be expensive (requiring use of multiple cameras), and/or may provide an inherently low accuracy of the z position estimate (by using a single camera together with, e.g., an inter-pupil distance calibration procedure).

VEHICLE OCCUPANT HEAD POSITIONING SYSTEM

TECHNICAL FIELD

This application generally relates to driver monitoring systems, and more particularly, to monitoring the head position and velocity of an occupant of a vehicle.

COPYRIGHT NOTICE

A portion of the disclosure of this document contains material that is subject to copyright protection. The copyright owner has no objection to the facsimile reproduction by anyone of the patent document or the patent disclosure, as it appears in the Patent and Trademark Office patent file or records, but otherwise reserves all copyright works whatsoever.

BACKGROUND

Driver inattention is considered to be the most prevalent cause of vehicle collisions. One study attributes 45% of all crashes and near crashes in an urban environment to driver inattention. (See Dingus et al., "The impact of driver inattention on near-crash/crash risk: An analysis using the 100-car naturalistic driving study data", *National Highway Traffic Safety Administration* (*NHTSA*) *publication,* 2006.). Another study estimated in 2003 that inattention caused between 25% and 30% of the police reported traffic crashes in the United States (See Hunter et al., "Driver inattention, driver distraction and traffic crashes", *ITE Journal,* 2003), which amounts to approximately 1.2 million crashes per year. Per the NHTSA's "Distracted Driving 2011" study (National Center for Statistics and Analysis, 2013), drivers not paying attention caused 387 000 injuries and 3000 deaths per year in the U.S. in 2011, and a similar study found that between 2005 and 2007, driver inattention was responsible for 32% of all the roads fatalities in Western Australia. (See Government of West Australia. Driver distraction—fact sheet. *Road Safety Commission publication,* 2014.) Clearly, there is a significant potential for reducing crashes, injuries and fatalities by addressing the issue of driver attention.

Driver Monitoring Systems (DMS) observe the behavior of a vehicle's driver and extract driver information, such as drowsiness, point of focus or "gaze position" (e.g., dashboard, rear view mirror, instrument cluster, etc.), or whether the driver has fallen asleep. This information is provided to a driver monitoring application that may take some sort of action, e.g., warning or waking the driver, or adjusting timing parameters in automated driver assistance system. The main purpose of driver monitoring applications is to avoid accidents due to driver inattention, but they may also be used for comfort functions, such as head-up display adjustment, etc. Essential to a driver monitoring application is an estimated position and velocity of the driver's head, especially for computing the driver's gaze position and gaze direction. It is not sufficient to estimate the position in two dimensions only. The gaze direction and gaze position are dependent on the three dimensional position of the head. Errors made in the head position estimate propagate to errors in the gaze position and gaze direction. A camera-only approach, with various techniques, may provide an estimate of the z-position (i.e., roughly normal to the driver's face), but may be expensive (requiring use of multiple cameras), and/or may provide an inherently low accuracy of the z position estimate (by using a single camera together with, e.g., an inter-pupil distance calibration procedure).

Therefore, a separate means to accurately and cheaply determine the three dimensional position and velocity is of great value for driver monitoring applications.

SUMMARY

Vehicle occupant head positioning systems are described that improve velocity tracking accuracy by fusing distinct techniques for estimating velocities (or inferred velocities), resulting in a more robust velocity estimate that depends upon conditions existing at the time of measurement. The systems are adapted for installation in the passenger compartment of an automotive vehicle equipped with driver monitoring systems (DMS). According to one aspect of the present invention, a system is provided that includes a wave sensing assembly having at least one transmitter for transmitting waves towards a head of an occupant in the vehicle, and at least one receiver for receiving waves reflected off the occupant head, and an image capture assembly comprising at least one camera directed at the head of an occupant, and at least one (e.g., infrared, etc.) light emitting device for illuminating the occupant's head when the images are being captured. The system also includes one or more sensor fusion processor(s) configured to process the received waves in order to compute a radial range of the head from the receiver(s), process the images captured by the camera(s) to determine an image position of the occupant's head, and to determine from the radial range and the image position a three dimensional position of the occupant's head.

In one embodiment, the wave sensing assembly transmits and receives radar or ultrasonic waves. The wave sensing assembly may compute the azimuth and/or elevation of the occupant's head with respect to the wave receiver(s).

In another embodiment, the vehicle occupant head positioning system includes an attachment mechanism for fixably securing the wave sensing and image capture components to the vehicle.

In another embodiment, the system includes a DMS configured to receive configured to receive the three dimensional position output from the sensor fusion processor(s). The DMS may include applications providing one or more types of functions, such as drowsiness estimation and alerting, driver inattention to traffic alerts, driver gaze direction estimation, driver gaze position estimation, driver identification, head-up display adjustment, and automatic sun-blocking.

The fusion processor(s) may determine the three dimensional position of the occupant's head by creating a head state model of a positional state of the occupant head, and determining a fused range based on the computed radial range and a range determined from frame-to-frame changes in image coordinates in the images captured by the image capture assembly. Then, the fusion processor(s) may convert the fused range and image coordinates of the captured images to three dimensional coordinates based on corresponding focal length(s) of the camera(s). The fusion processor(s) may then determine a best match between the head state model and the three dimensional coordinates, and update the head state model with the three dimensional coordinates and an occupant head track position predicted by the head state model.

In another embodiment, supplemental measurements, in the form of optical flow information from the image capture assembly and/or Doppler information from the wave sensing assembly, may be used by the fusion processor(s) to feed a time filtering component to improve the accuracy or reliability of the position or velocity estimate.

These and other features and advantages of the systems will be apparent from this disclosure. It is to be understood that the summary, drawings, and detailed description are not restrictive of the scope of the inventive concept described herein.

BRIEF DESCRIPTION OF THE FIGURES

The foregoing and other objects, features and advantages will be apparent from the following, more particular description of the embodiments, as illustrated in the accompanying figures, wherein like reference characters generally refer to identical or structurally and/or functionally similar parts throughout the different views. The figures are not necessarily to scale, emphasis instead being placed upon illustrating the principles of the embodiments, wherein:

FIGS. 6A-6D are illustrations of different wave receiver configurations, each capable of acquiring information for distinct head positioning attributes;

DETAILED DESCRIPTION

Figure 1:
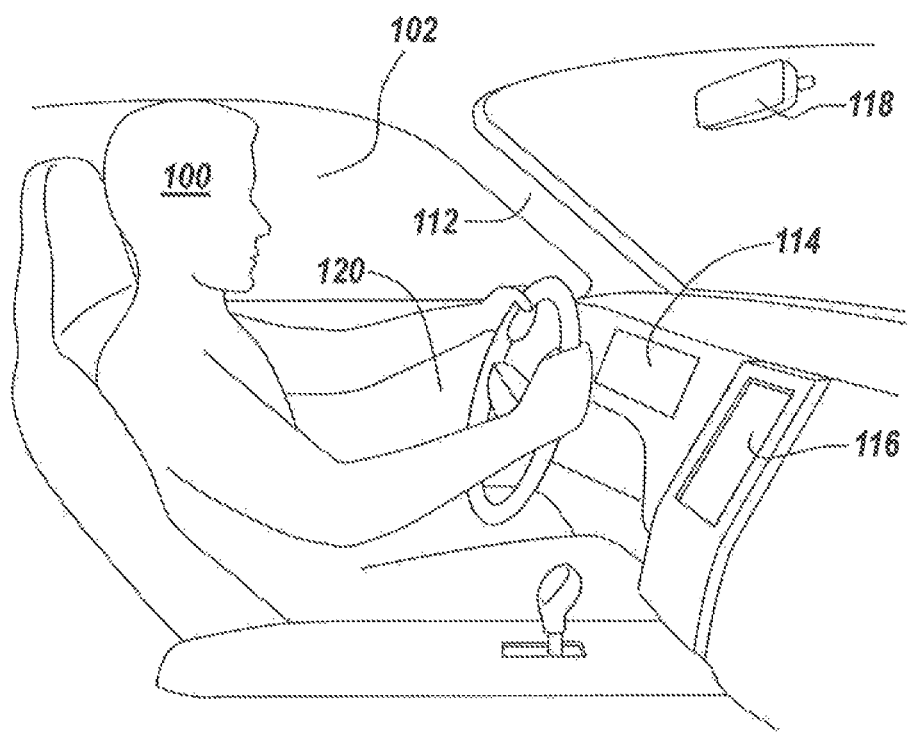
FIG. 1 is an illustration of a typical vehicle occupant compartment environment.

In the description that follows, like components may be given the same reference characters, regardless of whether they are shown in different examples. To illustrate an example(s) of the present disclosure in a clear and concise manner, the drawings may not necessarily be to scale and certain features may be shown in somewhat schematic form. Features that are described and/or illustrated with respect to one example may be used in the same way or in a similar way in one or more other examples and/or in combination with or instead of the features of the other examples.

With reference to FIG. 1, the object of a vehicle occupant head positioning system (HPS) is to determine positional information (e.g. position, velocity, etc.) of the head 100 of an occupant (e.g., a driver) in the vehicle compartment 102. As noted above, Driver Monitoring Systems (DMS) rely on HPS to make precise measurements related to the position of the occupant's head 100, so that some sort of action may be taken, e.g., alerting or waking the driver, or adjusting timing parameters in automated driver assistance systems. The main purpose of driver monitoring applications is to avoid accidents due to driver inattention, but they may also be used for comfort functions, such as head-up display adjustment, etc. For the purposes herein, therefore, whenever the position of the occupant is referenced it will mean the position of the head 100 of the occupant and not that of his/her arms, hands or legs. FIG. 1 illustrates several of the possible positions 112 (A pillar position), 114 (instrument cluster), 116 (central panel), 118 (middle rear view mirror) or 120 (center of the steering wheel) within compartment 102 where sensors may be placed.

Figure 2:
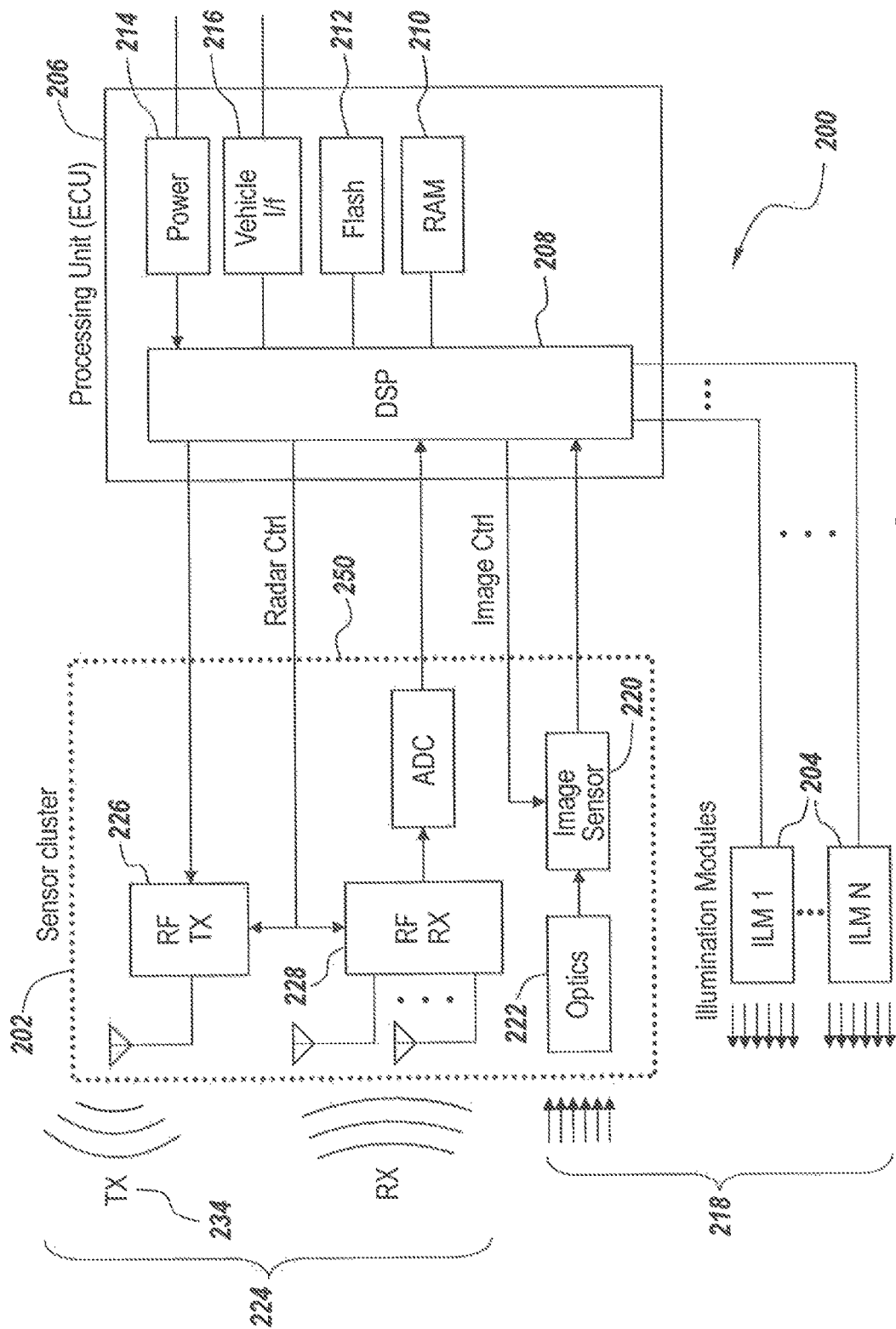
FIG. 2 is a schematic illustrating a circuit embodiment of a head positioning system configured with an imaging and radar sensing modalities.
Figure 3:
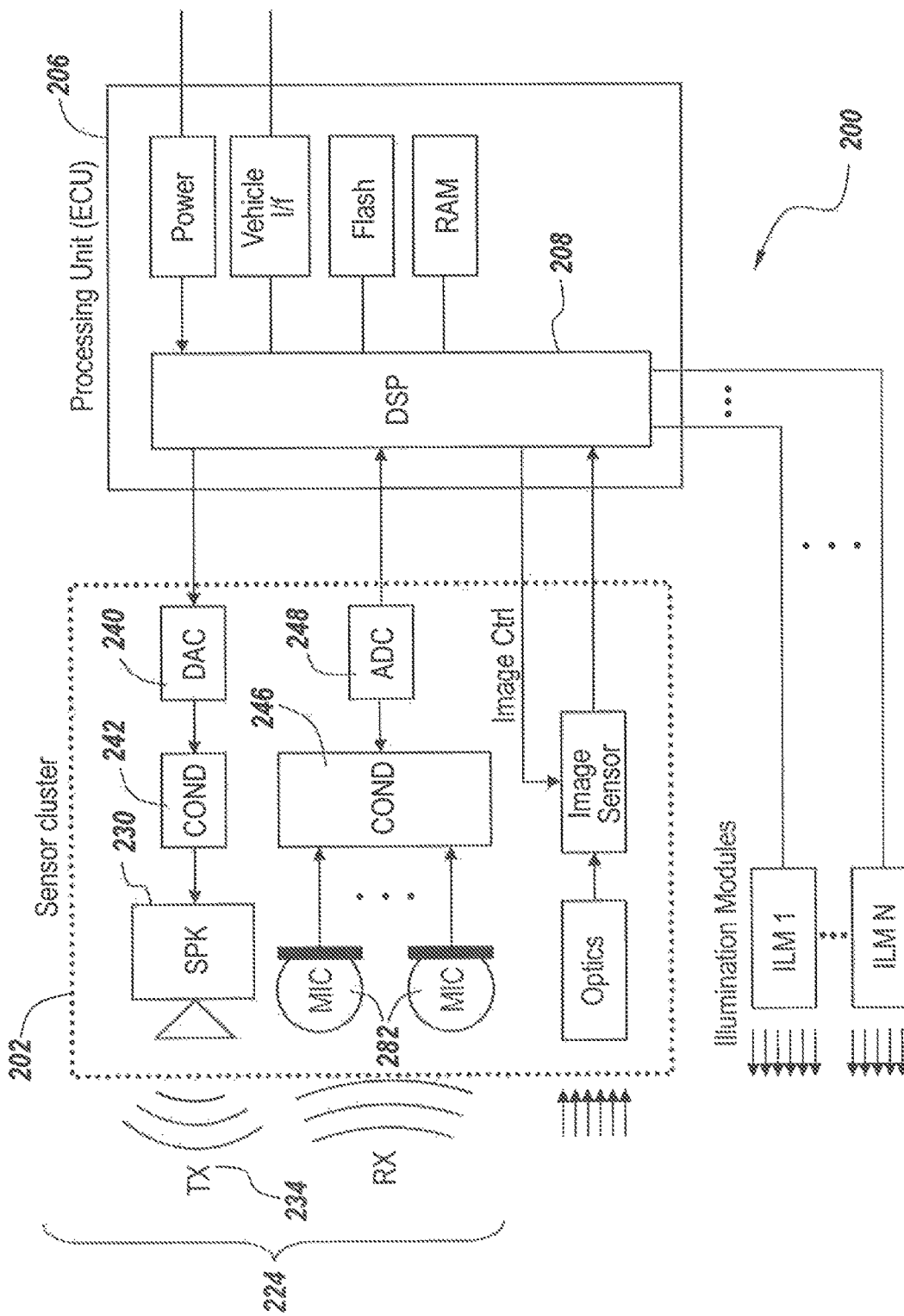
FIG. 3 is a schematic illustrating a circuit embodiment of a head positioning system configured with imaging and ultrasound sensing modalities.

FIGS. 2 and 3 show alternative embodiments of electronic circuitry associated with a HPS 200. HPS 200 may comprise hardware or firmware including a sensor cluster 202, one or more illumination modules (ILM's) 204, and an electronic control unit (ECU) 206 further comprising a digital signal processor (DSP) 208 and associated circuitry—RAM 210, flash memory 212, power 214 and vehicle interface 216—needed to control and process the information to and from the sensor cluster 202 and ILMs 204, and to perform vehicle communication. An image capture means 218 may comprise the ILMs 204, at least one camera 220, camera foreoptics 222 and related circuitry. A wave sensor assembly 224 may include, as shown in FIG. 2, one or more radar transmitters 226, receivers 228, and related circuitry, such as those commercially available from Texas Instruments, Inc., and Analog Devices, Inc. FIG. 3 illustrates the alternative embodiment, wherein the wave sensing assembly 224 includes one or more ultrasonic transmitters 230 (i.e., speakers, etc.) and receivers 232 (i.e., microphones). DSP 208 receives position and velocity information containing signals from the wave sensing assembly and image capture assembly, and processes the signals utilizing a fusion algorithm in order to calculate three-dimensional position information for the driver's head 100. DSP 208, in turn, may output the calculated three-dimensional position information to a DMS.

The transmitter(s) 226, 230 may emit waves 234 of radiofrequency energy (such as shown in FIG. 2) or an ultrasonic acoustical energy (such as shown in FIG. 3) that reflect off the head 100 of the driver and returns to one or more corresponding receiver(s) 228, 232. The waves 234 returning to the receivers 228, 232 may be used by DSP 208 to determine head position and motion parameters such as a radial range, velocity, and/or angles of azimuth and elevation. The transmitters 226, 230 and receivers 228, 232 may be fixably secured to the vehicle in closely proximity, or be separated in a known fixed geometry. The camera(s) 220, which may comprise near infrared cameras, may similarly be affixed to the vehicle at certain positions within the vehicle compartment 102, and may be configured in one or more sensor clusters 202 with the wave receivers 228, 232. DSP 208 may extract image position information for the driver's head 100 from the images captured by the camera(s) 220.

The sensor cluster(s) 202 should be positioned such that they have an unobstructed view towards the driver head 100, such as at positions 112 (A pillar position), 114 (instrument cluster), 116 (central panel), 118 (middle rear view mirror) or 120 (center of the steering wheel). The field of view of the camera(s) 202, and the beam width of the wave(s) 234 are preferably designed to be wide enough to cover the entire region in which the driver head 100 might move. ILMs 204 periodically illuminate the driver's head 100, and may be placed at the same location(s) as the sensor cluster(s) 202, or may be placed at different locations, provided that shadows, reflections and glare (e.g., forming in the driver's eyes or glasses, etc.) within the vehicle compartment 102 at or near the driver's head 100 can be controlled. A plurality of ILM's 204 may be positioned at different locations. The ILMs 204 may be positioned and enabled so as to suppress reflections by alternately enabling the ILMs 204 upon successive image captures. However, care should be taken to not introduce shadowing effects such as might arise if the ILMs 204 were to be placed very far from the camera 220.

The wave sensing assembly 224 and image capture assembly 218 communicate with DSP 208, whose positioning may be practically limited to positions 114, 116 or 118, if it is desirable to integrate the sensor cluster 202, ILMs 204, and DSP 208 into a single unit. A solution with co-located sensor cluster 202 and ECU 206, physically separated from the ILMs 204, may be a viable and attractive option. In such a configuration, the integrated ECU 206 and sensor cluster 202 unit could be placed at any of positions 114, 116 and 118, and ILM's 204 may be placed at position 112 or 120 (or possibly at 114, 116 or 118, but not integrated onto the ECU/SC unit). A third solution, with completely separate ECU 206, sensor cluster 202 and ILMs 204 is also possible, providing the largest degree of freedom, at the commensurate highest cost.

Figure 4:
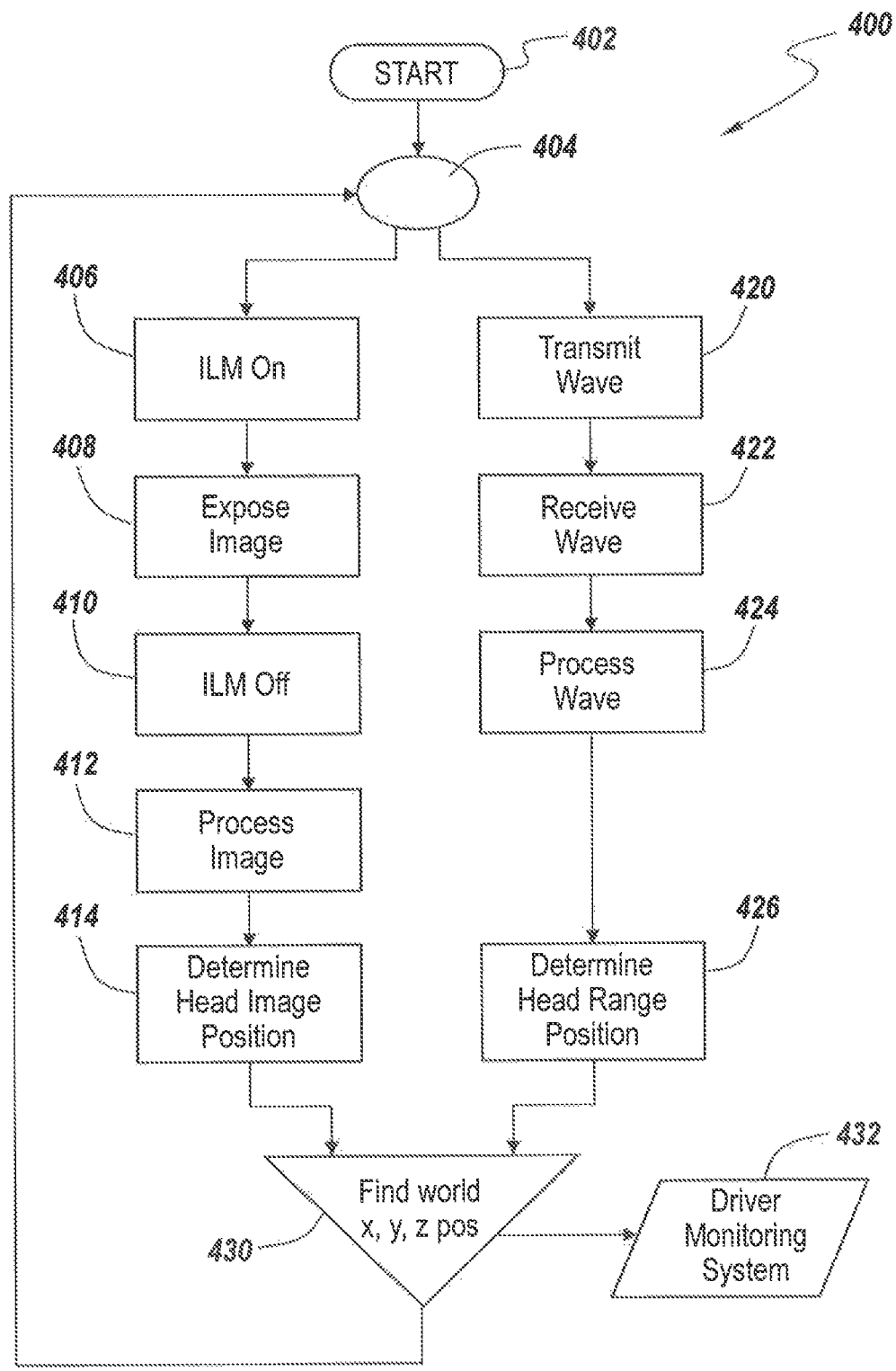
FIG. 4 is a flowchart of an exemplary method for determining head position in accordance with an embodiment.
Figure 5A:
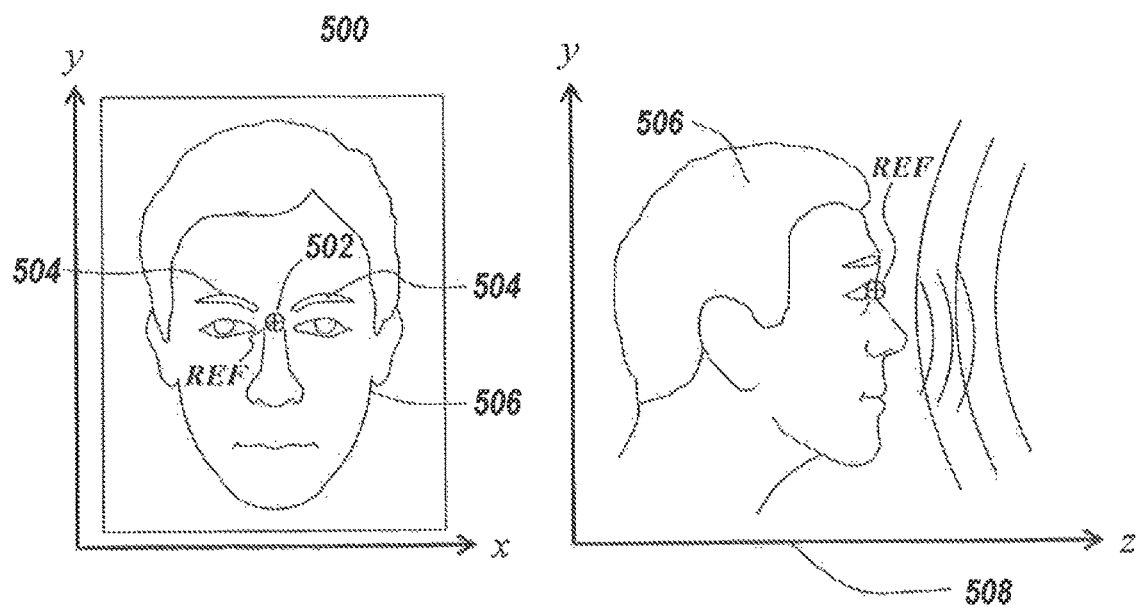
FIGS. 5A and 5B are illustrations of coordinate axes aligned in a typical driving position for a driver's head.
Figure 5B:
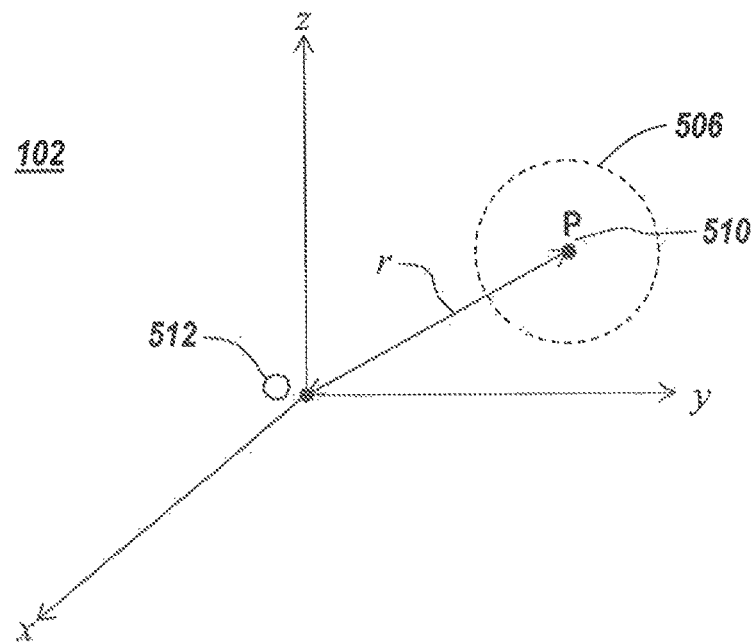

FIG. 4 is a flowchart illustrating an embodiment of a method 400 for determining position and velocity of the driver's head 100. Method 400 features two parallel flows, one for camera capture and processing, and one for wave capture and processing. After start (402) and cycle initialization (404), the program flow takes to different paths, (virtually) simultaneously. One path controls the image capture assembly 218, while the other controls the wave sensor assembly 224. ILMs 204 are periodically enabled by the DSP 208 just before (406) the image is captured (408) by the camera 220 and then disabled (410). Illumination of the driver's head 100 is likely needed to ensure high availability of the camera imaging capability, irrespective of ambient light conditions. Due to eye safety, driver distraction and/or nighttime driving reasons, the wavelength of the emitted light wave 234 may preferably be in the infrared (IR) spectrum. Since the amount of light needed to fully illuminate the face of the driver is relatively high, there may be an eye safety need to limit the duration of the illumination event. Prolonged exposure of intense infrared light may inflict retinal injury. Another reason for limiting the duration of ILMs 204 lighting is that commercially available light-emitting diodes (LEDs) may suffer from thermal breakdown when used in a continuously 'on', high intensity fashion. One solution is to activate the ILMs 204 only when the camera 220 is capturing images. The optics 222 may capture the reflected light from the driver's head 100 and display the light onto camera(s) 220, which may comprise a charge coupled device (CCD) array. The image is read and processed (412) to determine (414) the x- and y-coordinates of one or more reference position(s) of the head 100 in the captured image. The camera(s) 220 are able to track multiple features on the driver's head, such as eyes, ears, head bottom and head top from the geometry of the face. For example, even if temporarily obscured (e.g., by sunglasses, etc.), the position of the driver's eyes may be inferred. With reference to FIG. 5A, an exemplary reference position 502 may be located in a captured image 500 between the eyes 504 of the imaged head 506. A single reference position is sufficient, as the range to the head 506 will not change dramatically from a few degrees of azimuth or elevation, however multiple reference points will produce more accurate results but require a higher resolution sensing (e.g., more samples over a longer sampling interval, higher bandwidth, etc.). FIG. 5A also illustrates how coordinates axes may be aligned during a normal driving position. The camera 220 may capture the image(s) 500, which lies more or less in an x/y plane in the vehicle compartment 102, and the z axis (radial range) 508 is perpendicular to both the x and y axes. FIG. 5B illustrates an exemplary three-dimensional coordinate system within a vehicle compartment 102, wherein point P 502 represents a point target on imaged head 506, and origin point O 512 represents the sensor (whichever sensor is acquiring positional information at the instant time.) Of course, the coordinates could alternatively be defined such that origin point O represents a point on the head.

The other process flow path concerns the wave sensor. Approximately simultaneous with the illumination by the ILMs 204, the waves 234 may be transmitted (420) from the radar transmitter antenna 226 (or ultrasound speakers 230). The reflected waves may be received (422) and processed (424) to determine (426) the radial head range (z-position of head 100) from the receiver 228. If short enough pulses are used, transmitter antenna 226 and receiver 228 may comprise the same antenna. If separate antennas are utilized, they may be collocated to avoid the requirement to apply coordinate transforms to the received signals. Waves 234 transmission may be controlled by DSP 208. In the ultrasonic embodiment (FIG. 3), control signals from the DSP 208 are converted to analog signals in the DAC 240, which are signal conditioned and amplified in conditioner 242, before being emitted by speaker 230. When the reflected waves 234 return, they are captured by microphones 232, and the resulting signals are amplified and conditioned in conditioner 246, converted into a digital stream by the analog to digital converter 248 before entering the DSP 208. In the radar embodiment depicted in FIG. 2, DSP 208 starts the transmission (420) of waves 234 by triggering the RF transmitter electronics. When the reflected waves return, they are received by the receiver 228, demodulated by the RF electronics and the result sampled by the ADC converter 250. While waves 234 may comprise ultrasonic waves, greater accuracy, as well as a capability to compute Doppler velocity, may be provided through the use of radar waves. Radar provides many more updates per second than sonar, and higher Doppler resolution (greater accuracy and object distinguishing capability). It is estimated that a typical roundtrip (transmittal to and reflection from the head 506) time for sonar is approximately 33 milliseconds versus 3.33 nanoseconds for radar. Synchronization of the wave triggering (420) and camera capture (408) may optionally be employed to reduce the time difference between the two different measurements, however the inventors have determined that a asynchronous sensor sampling may be employed with negligible loss of performance of the HPS 200. The camera 220 requires a clock cycle of at least 60 Hz (17 millisecond period) to enable eye blink detection analyses, while typical automotive radar systems use a cycle period of 40 milliseconds (however, this could easily be reduced to 5 milliseconds or less.)

As shown in FIGS. 6A through 6D, each wave receiver 228, 232 may comprise one to four receiver elements 602, in various configurations. In 6A, a single receiver element 602 would be capable of gathering only enough wave information for computation of a radial range of the driver's head 506. The use of two receiver elements 602 permits the determination of an angle, i.e., the azimuth of the head 506 (by horizontal receiver element placement shown in 6B, or the elevation of the head 506 achieved by vertical arrangement of the receiver elements shown in 6C. The use of four receiver elements 602, as shown in 6D, allows determination of all three parameters—range, azimuth and elevation. In radar wave implementations, the range(s) to multiple reference points on the driver's face may be obtained, but it may prove difficult to know exactly which points will scatter and/or reflect back. Obtaining multiple reflections with range, Doppler (speed), azimuth, and elevation permits construction of a state model of the head.

The bit stream output by ADC converter 250 enters DSP 208 for find world position processing (430) to determine the three dimensional (x,y,z) position of the driver's head 506 within the vehicle compartment. Once the world (x,y,z) position parameters are determined, they may be output (432) to a DMS. The DMS may proceed to estimate the pose (position and orientation) of head 506, and combines that with a gaze direction (coming from the eyes) to deduce a three-dimensional vector for the direction in which the driver is looking. The gaze position is typically determined by geometrically calculating an intersection point between the gaze vector and a surface of interest. Vehicle manufacturers typically desire a high accuracy (~5 mm) of the gaze point when projected on the surface.

Figure 7:
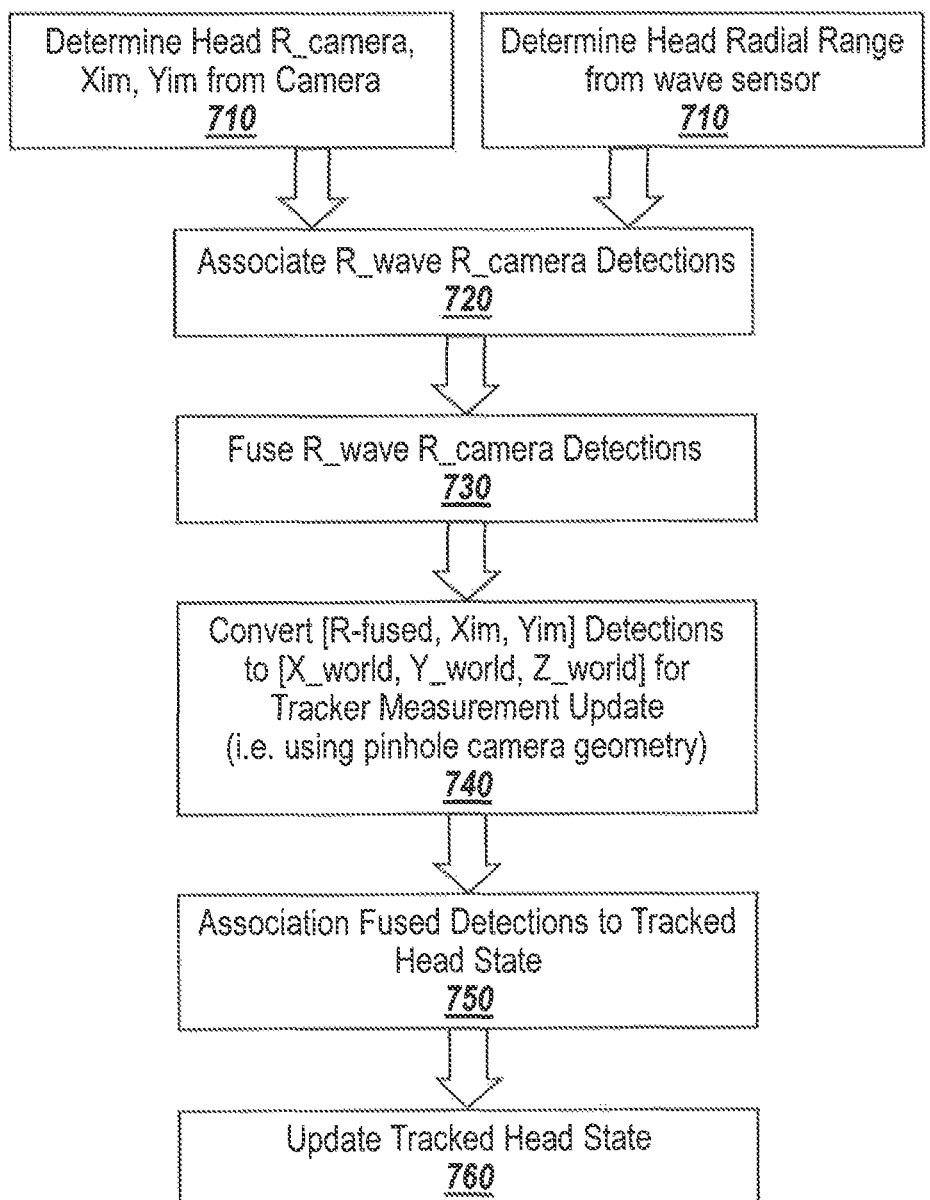
FIG. 7 is a flowchart of an exemplary method for finding three dimensional (world) coordinates for a tracked head position.

FIG. 7 shows a flowchart of sub-processing steps performed in find world position process 430. In more naïve implementations of the find world 3D (x,y, z) position process 430, x and y pixel coordinates of the head 506 may be easily determined using conventional camera pattern recognition and machine learning techniques using the height and width of the head 506 in the captured image(s), and transformed to real world (e.g., vehicle compartment 102) coordinates with the focal length and distance to the target using pinhole geometry, and the z-coordinate may be set to the radial range (i.e., a distance from the receivers 228, 232 to the reference point 502 and/or other preselected point(s) on the head.) The velocity (i.e., speed and direction) of the head 506 can be computed using image flow techniques between successive frames of captured images and Doppler speed measured by the radar or ultrasonic wave sensor. More advanced embodiments of process 430 may involve building a head state model (HSM) (that may be initialized in step 402) for three dimensional head position and movement, which may include more measurement states (e.g., azimuth, elevation and Doppler from the wave sensor assembly 224, and image flow from the image capture assembly 218.) The HSM may be continuously updated to track the movement of the head. Measurement accuracies and process errors for the image and wave sources may be estimated for construction of a Kalman filter that can be fed with a series of position and velocities over time to increase precision. The Kalman filter may be used to predict roll, pitch and yaw of the head 506.

In the initial step (710), DSP 208 may receive the range and image coordinate measurements from the camera 220 (determined in step 414), and the head radial range measurements from the wave receiver 228 (determined in step 426) and passes them onto association process 720. It has been determined that conversion between image coordinates and world coordinates using range that is subject to measurement noise can result in pronounced errors in gaze propagation by the DMS (which world coordinate axis is affected more from the range error will depend on the orientation of the coordinate system.) Thus, techniques for increasing the precision of the measured range may be employed. For the association process 720, the wave sensor range measurement may be preferably used, since the camera range measurement might be noisy (the camera measured range can be assumed to be correctly associated to a tracked head state during the camera head classification process.) The respective range measurements may be compared with a predicted range generated by the HSM (if the camera 220 is used as the world reference coordinate system, the wave receiver 228 will need a coordinate transform to place its range measurement with respect to the camera's), to determine which range measurement is more appropriate for use. First the tracked head state of HSM must be propagated using a state transition model of the system, which facilitates time and spatial transformations, moving in time between updates from measurements, and coordinate transforms between measurement domain and the coordinate reference frames of the head.

$$[X_k] = \begin{bmatrix} x_k \\ \dot{x}_k \\ y_k \\ \dot{y}_k \\ z_k \\ \dot{z}_k \end{bmatrix}, [X_{k|k-1}] = [F_k] \begin{bmatrix} x_{k-1} \\ \dot{x}_{k-1} \\ y_{k-1} \\ \dot{y}_{k-1} \\ z_{k-1} \\ \dot{z}_{k-1} \end{bmatrix}.$$

An observation matrix, H, converting between measurements and state spaces can be given by $$[H_{radar}] = [x/r\ 0\ y/r\ 0\ z/r\ 0]$$

Therefore, the change in range, Δr, between the wave sensor measurement (e.g., radar) and the tracked head position can be given by $$\Delta r = r_{radar} - [H][X_{k|k-1}].$$

The range detection from the wave receiver 228 can then replace the range estimate of the camera 220, or fuse with it (process step 730). For example, the variance can be used to weight the signals $$\text{var}(X) = E[w^2 X_1 + (1-w)^2 X_2]$$

$$w = \left( \frac{\sigma_{camera}^2}{\sigma_{wave}^2 + \sigma_{camera}^2} \right)$$

$$r_{fused} = w r_{wave} + (1-w) r_{camera}.$$

Figure 12:
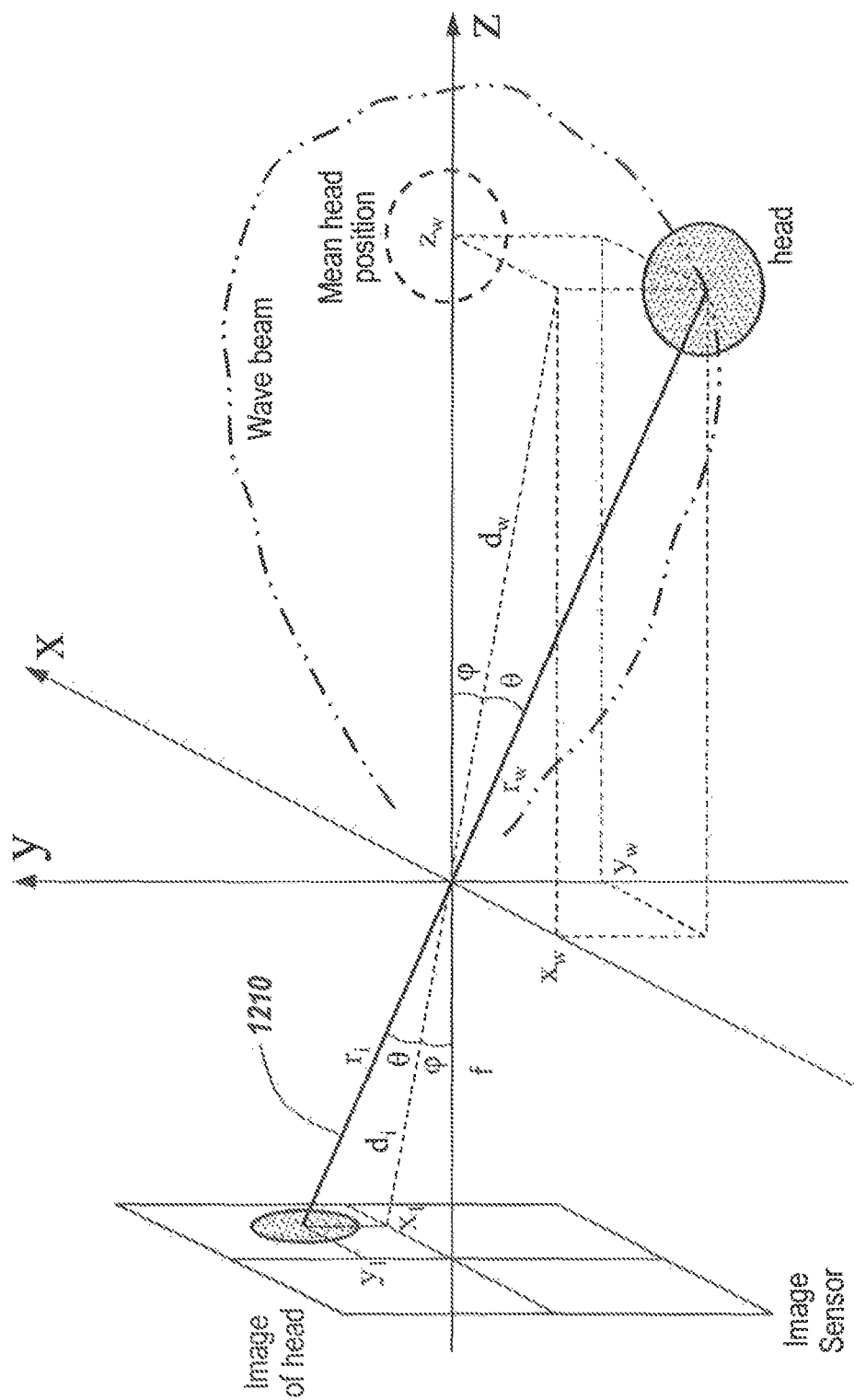
FIG. 12 illustrates a coordinate system definitions used for pin-hole geometry and the geometrical alignment between the camera and the wave transmitter and sensors.

This fused range can be converted into Cartesian coordinates (process step 740) using the image x- and y-coordinates and the focal length f of the camera 220. For example, using pinhole geometry provides the following relationships with the coordinate system definitions of FIG. 12, where the z-axis represents the center direction of the camera and the direction of the wave beam and an exemplary light ray 1210 exemplifies a shortest distance wave path. The derivation assumes the camera and wave transmitter and sensor are pointed towards the mean head position and that the waves are mainly reflected from the head.

$$x_w = -r_w \frac{x_i}{\sqrt{x_i^2 + y_i^2 + f^2}}$$

$$y_w = -r_w \frac{y_i}{\sqrt{x_i^2 + y_i^2 + f^2}}$$

$$z_w = -r_w \frac{f}{\sqrt{x_i^2 + y_i^2 + f^2}}$$

Exemplary code that may be executed by DSP 208 in performing such conversions may include the following: Head image coordinates may be obtained via the computer vision algorithms

```
% head image coordinates
head_pos = cv_obtain_head_position(image);
x_im(n) = head_pos.x;
y_im(n) = head_pos.y;
% compute length of ray within camera
r_i = sqrt(x_im(n)^2 + y_im(n)^2 + focal_length^2);
```

Then, the pinhole geometry equations may be used to determine the position of the head in three dimensions, by combining the radar range measurements with the image coordinates. Notably, the range measurement may be used to obtain all of the real world coordinates XYZ, i.e., thus errors in range may create errors in the other directions. Advantageously, the current invention obtains image coordinates with essentially perfect CMOS sensing.

```
% get wave sensor range information
r_meas(n) = wave_sensor_obtain_range(wave_data);
% Combine the radar range with the image coordinates to obtain
% high accuracy world position of head
x_world(n) = -x_im(n) * r_meas(n) / r_i;
y_world(n) = -y_im(n) * r_meas(n) / r_i;
z_world(n) = focal_length * r_meas(n) / r_i;
```

Serial measurements from the wave sensor assembly 224 and image capture assembly 218 can provide a plurality of fused detections in Cartesian coordinates (process step 750). Each of these fused detections can be associated with the tracked head state of HSM, to provide the best match between the tracked head state and the measurements $[x_{world}, y_{world}, z_{world}]$.

The extrinsic positional state of the head 506 may be modeled and tracked (e.g., by a Kalman filter), with states given by Cartesian position and velocity (and covariance matrices in the case of a Kalman filter). An exemplary set of Kalman filter equations for use by HSM may include the following:
Predict
Predicted state update: $\hat{x}_{k|k-1} = F_k \hat{x}_{k-1|k-1} + B_k u_k$
Covariance update: $P_{k|k-1} = F_k P_{k-1|k-1} F_k^T + Q_k$
Update
Measurement-Prediction Residual: $\hat{y}_k = z_k - H_k \hat{x}_{k|k-1}$, (where $z_k$ is the measurement, $y_k$ is the difference between the predicted state estimate and the measurement, $H_k$ is used to transform to same coordinate system)
Innovation: $S_k = H_k P_{k|k-1} H_k^T + R_k$
Kalman Gain (determining residual weighting): $K_k = P_{k|k-1} H_k^T S_k^{-1}$
State Update: $\hat{x}_{k|k} = \hat{x}_{k|k-1} + K_k \hat{y}_k$
Covariance Update: $P_{k|k} = (I - K_k H_k) P_{k|k-1}$ The fused measurements may be combined with the predicted track position (process step 760) to update the tracked head state in the HSM. With respect to the camera's reference frame, observation matrix H, converting between measurement and state spaces, would be represented by $$[H_{fused}] = \begin{bmatrix} 1 & 0 & 0 & 0 & 0 & 0 \\ 0 & 0 & 1 & 0 & 0 & 0 \\ 0 & 0 & 0 & 0 & 1 & 0 \end{bmatrix}.$$

With the conversion between measurement space, m, and state space, k, assuming the camera is mounted directly in from of the person with no rotation between camera and head axis, being given by $$\begin{bmatrix} x_m \\ y_m \\ z_m \end{bmatrix} = \begin{bmatrix} 1 & 0 & 0 & 0 & 0 & 0 \\ 0 & 0 & 1 & 0 & 0 & 0 \\ 0 & 0 & 0 & 0 & 1 & 0 \end{bmatrix} \begin{bmatrix} x_{k|k-1} \\ \dot{x}_{k|k-1} \\ y_{k|k-1} \\ \dot{y}_{k|k-1} \\ z_{k|k-1} \\ \dot{z}_{k|k-1} \end{bmatrix}.$$

Figure 11A:
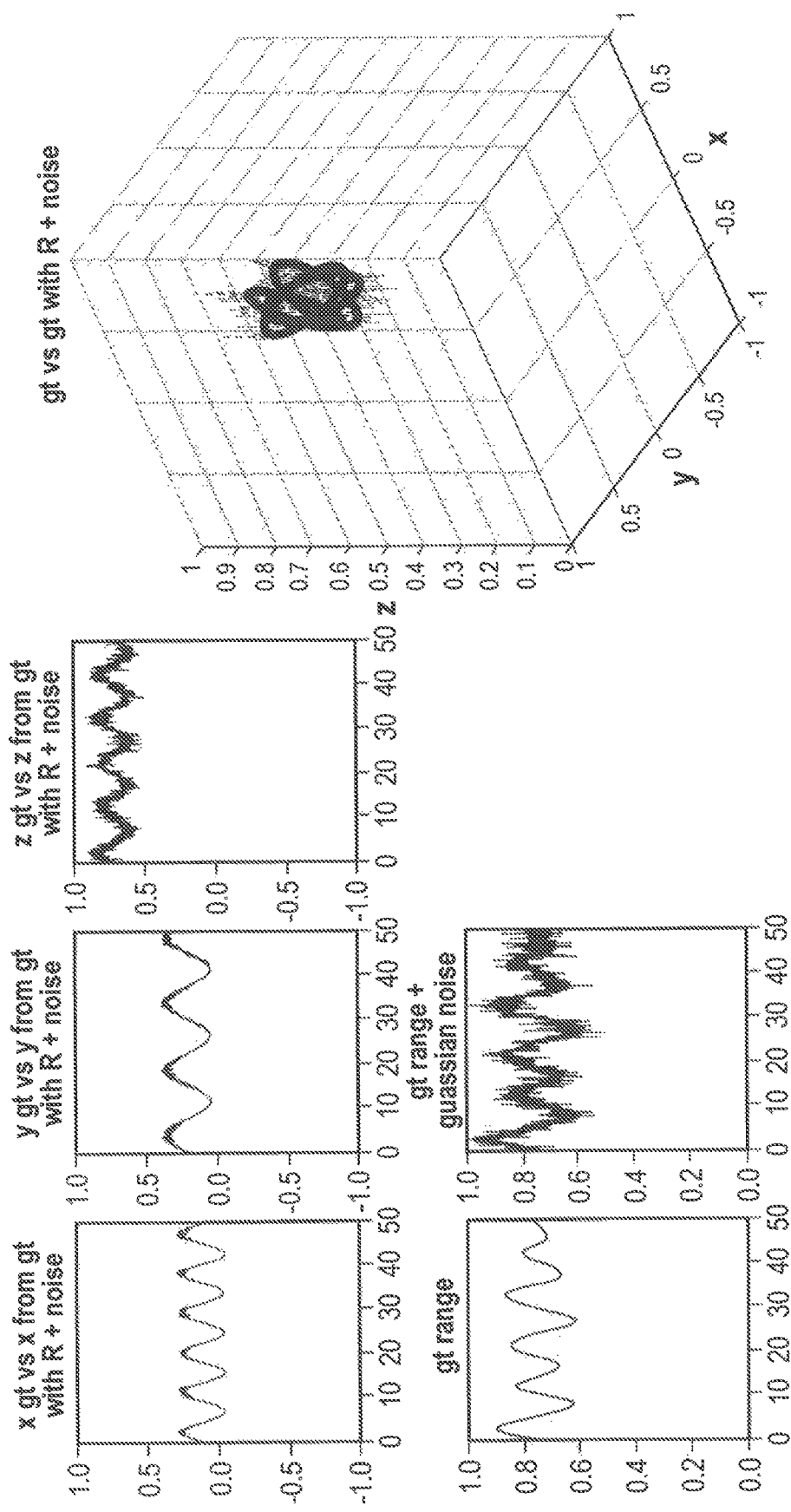
FIGS. 11A-11C are charts illustrating the effect of range noise propagating through transformation onto estimates of real world three-dimensional coordinates.
Figure 11B:
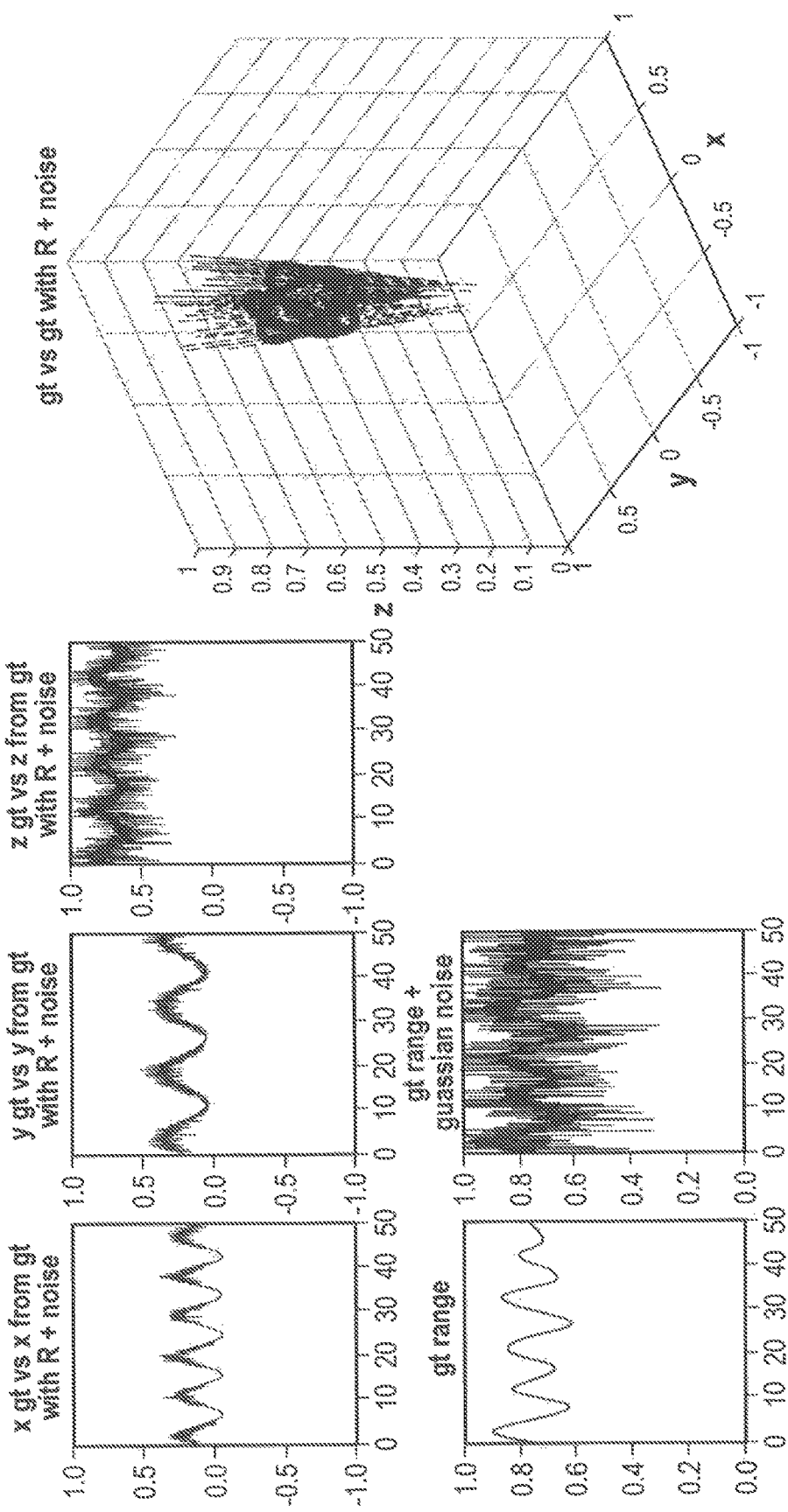
Figure 11C:
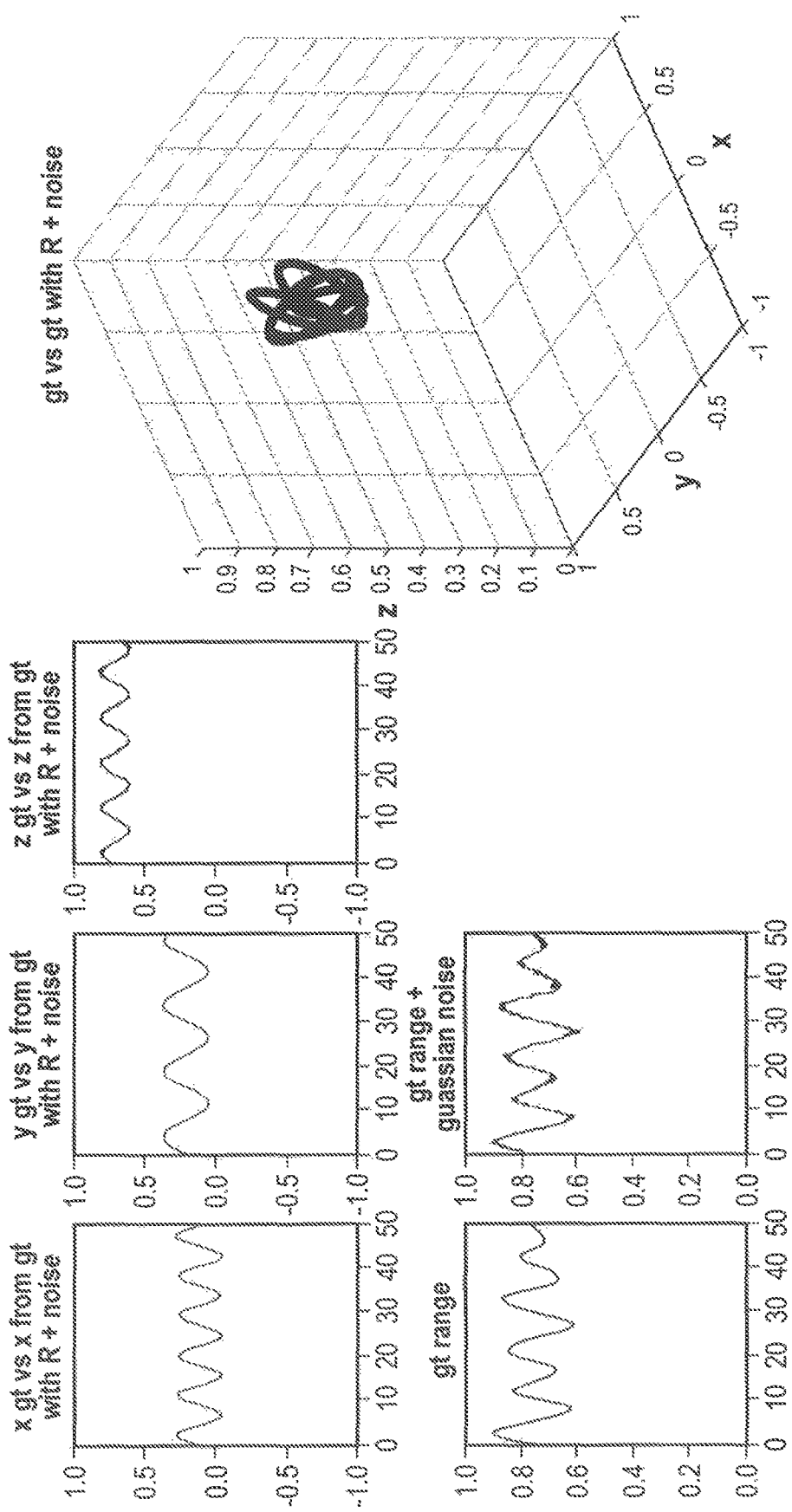

An advantage of process 430 as shown in FIG. 7 is that the best measurements, i.e., range from (radar) wave receiver 228, and image coordinates from camera(s) 220, may be used as inputs to update (760) of the tracked head state of the HSM (using range from radar and image positions from camera provides the most accurate determination of world (x,y,z) coordinates for head 506), increasing the quality of the measurements. Due to the propagation of errors in converting image coordinates to real world coordinates when the range estimate is poor, this method of fusing the range estimate may comprise a preferred embodiment. FIG. 11A illustrates an example of range noise propagating onto Cartesian dimensions, where the conversion between image coordinates and real world coordinates using range has had Gaussian noise of standard deviation 0.05 m added on top of the range measurement (synthetic ground truth is labeled 'gt'.) In particular, the effect on the measurement of the z-axis is pronounced, causing errors in gaze propagation of the DMS (which axis suffers more from the range error will depend on the orientation of the coordinate systems.) FIG. 11B illustrates the effect of Gaussian noise of standard deviation 0.15 m, which shows errors in range estimation propagating into the other dimensions. FIG. 11C illustrates the effect of Gaussian noise of standard deviation 0.01 m, similarly resulting in errors propagating into the other dimensions.

With reference to FIGS. 8 and 9, additional features in more advanced embodiments of find world position process 430 may be added, such as the addition of Doppler velocity, azimuth, and elevation from the wave receiver 228, and optical flow from the image capture assembly 218, providing additional dimensions to improve accuracy during the detection association, detection fusion, detection conversion, and track association and update processes.

Figure 8A:
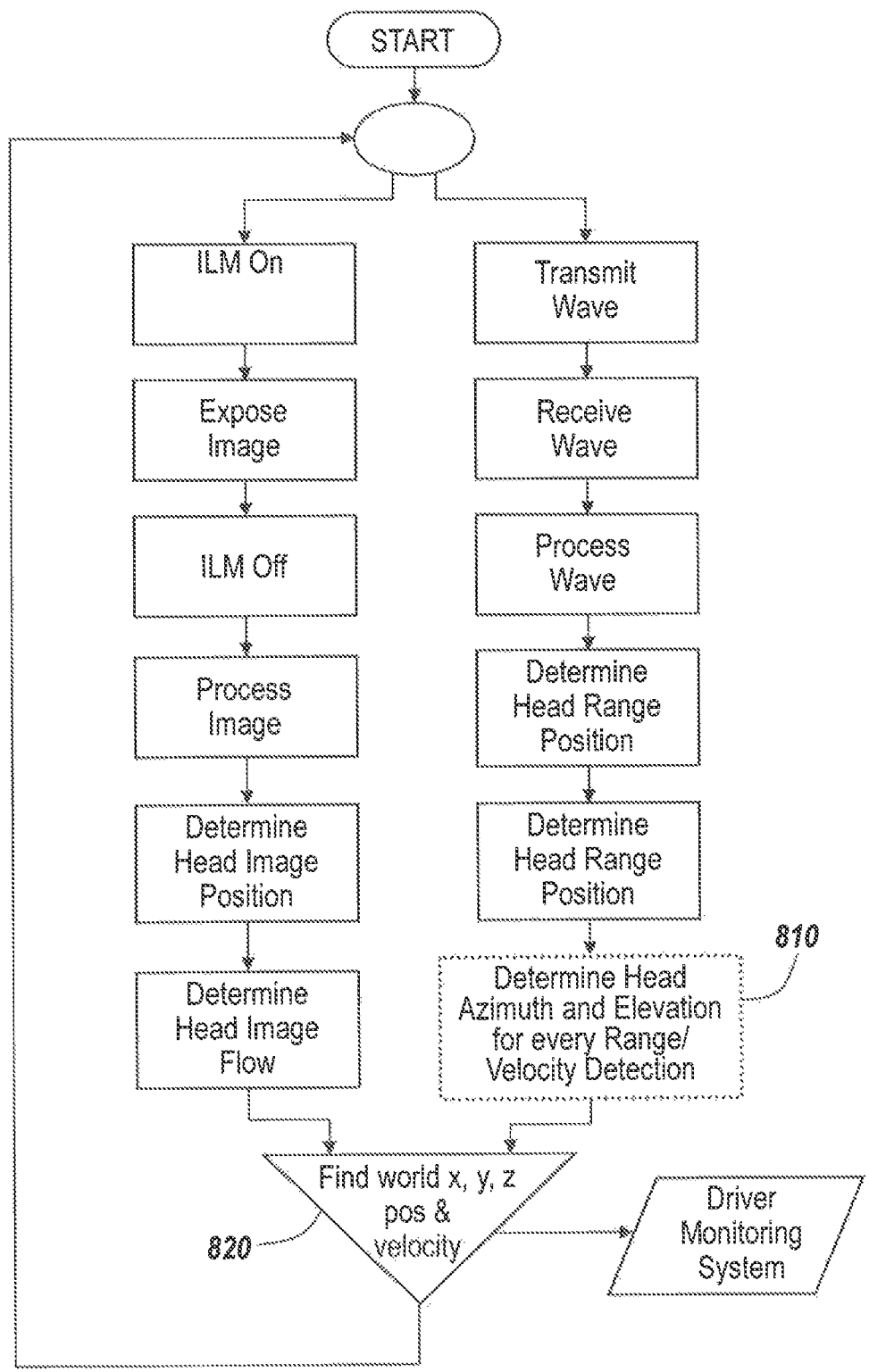
FIGS. 8A and 8B are flowcharts of, respectively, alternate embodiments of the head positioning method and finding world position processes.
Figure 8B:
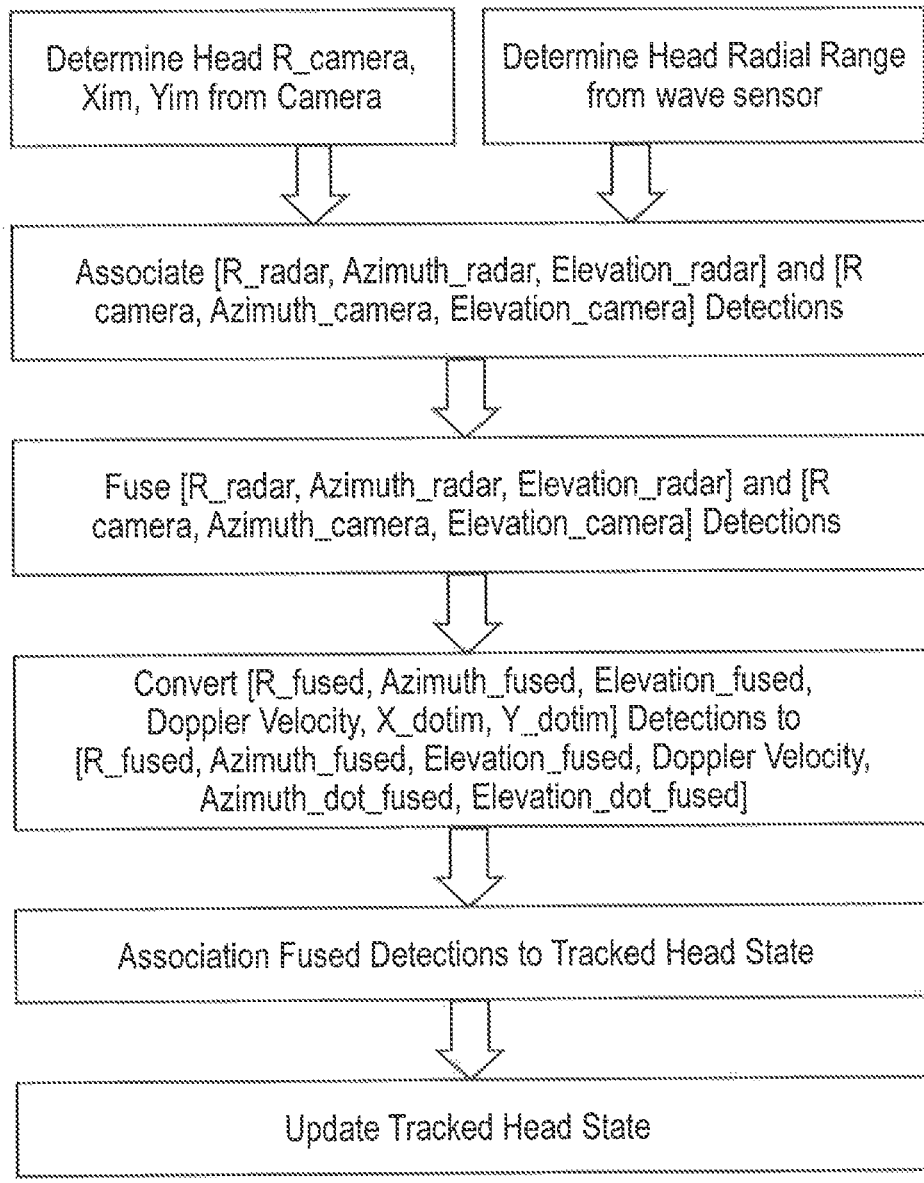

FIGS. 8A and 8B, respectively, show extended versions of the head position process of FIG. 4 and the find world position process of FIG. 7. The processes are similar to their more basic counterparts, but feature velocity determinations (820). An optional step (810) for head elevation and azimuth estimation is also present, for cases wherein the receiver configuration includes multiple receiver elements. With respect to the find world position process embodiment of FIG. 8B, the tracked head state is updated serially, and the camera 220 would have the same observation matrix as that of the embodiment shown in FIG. 7, given by $$[H_{camera}] = \begin{bmatrix} 1 & 0 & 0 & 0 & 0 & 0 \\ 0 & 0 & 1 & 0 & 0 & 0 \\ 0 & 0 & 0 & 0 & 1 & 0 \end{bmatrix}.$$

The radar measurements could convert between polar and Cartesian coordinates $$[H_{radar}] = [x/r \, 0 \, y/r \, 0 \, z/r \, 0]$$

With the conversion between measurement space, m, and state space, k, assuming the radar wave sensing unit mounted directly in front of the driver with no rotation between camera 220 and the head axis, being given by $[r_m]$, where $$[r_m] = [x/r \ 0 \ y/r \ 0 \ z/r \ 0] \begin{bmatrix} x_{k|k-1} \\ \dot{x}_{k|k-1} \\ y_{k|k-1} \\ \dot{y}_{k|k-1} \\ z_{k|k-1} \\ \dot{z}_{k|k-1} \end{bmatrix}.$$

An advantage of this embodiment of find world position process 430 is that there are more frequent updates of the HSM, since the camera 220 and wave receiver 228 are able to update the HSM independently at their own measurement frequency.

Figure 9A:
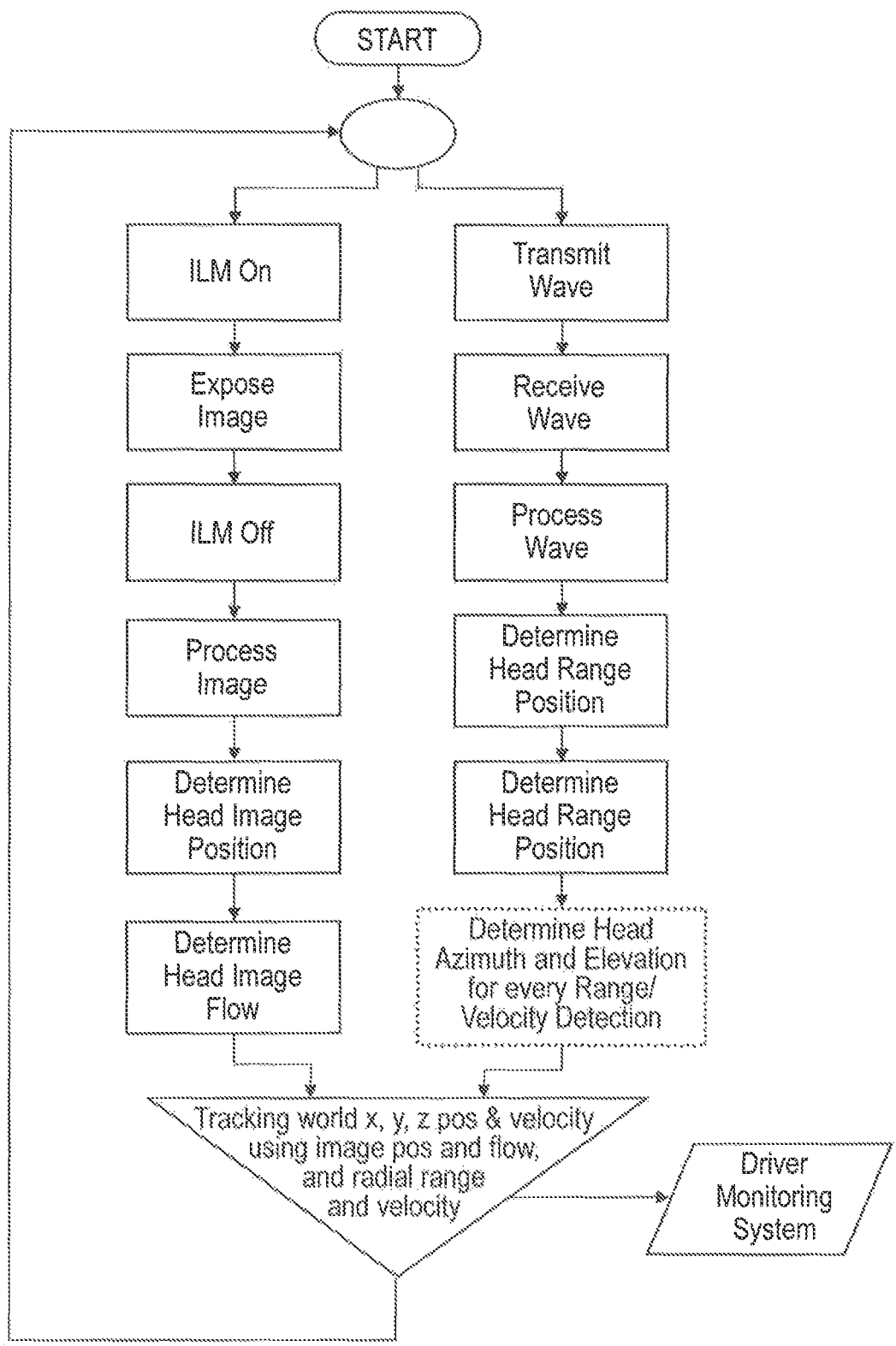
FIGS. 9A and 9B are flowcharts of, respectively, alternate embodiments of the head positioning method and finding world position processes.
Figure 9B:
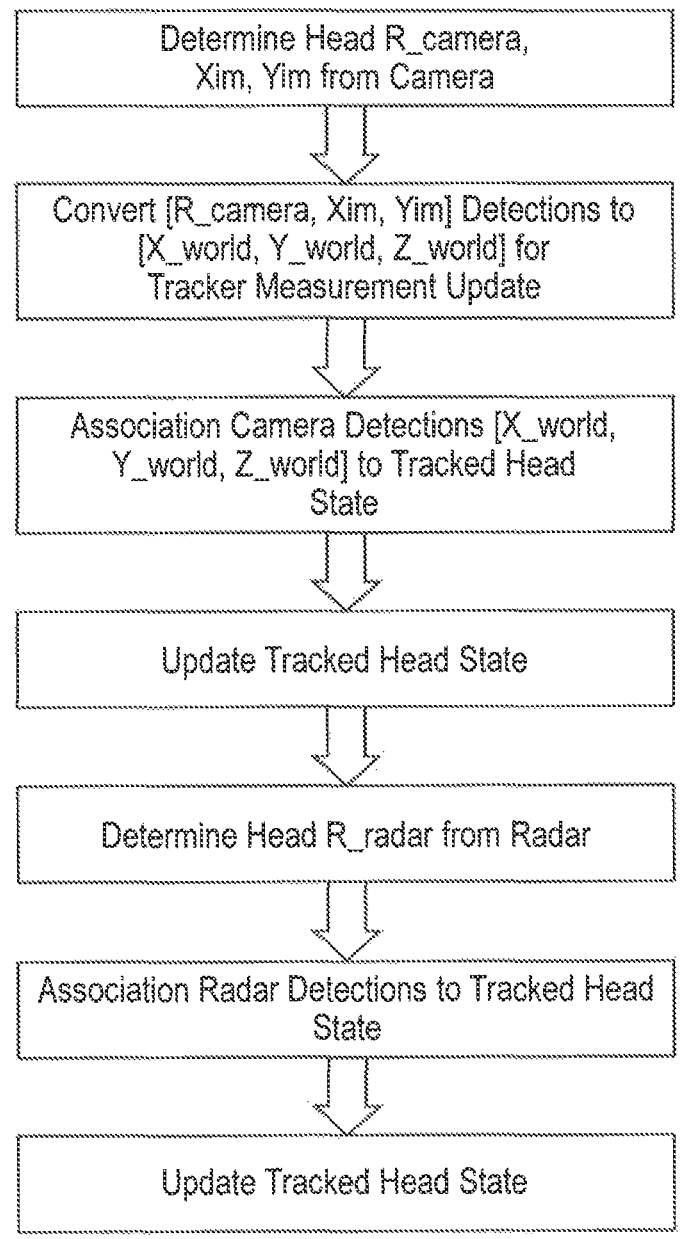
Figure 10A:
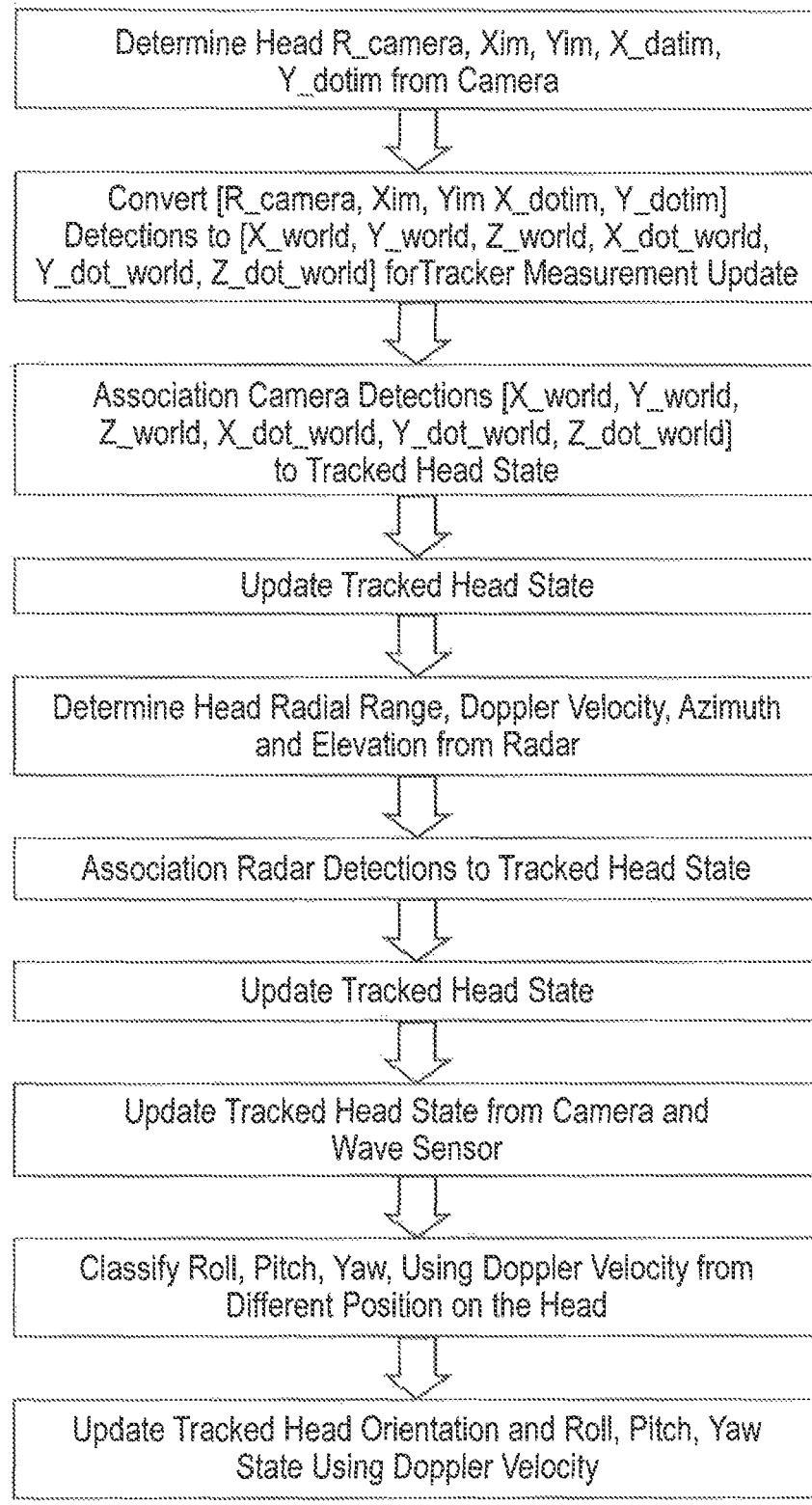
FIG. 10A is a flowchart of an alternate embodiments of the finding world position process adding position features of head roll, pitch and yaw.
Figure 10B:
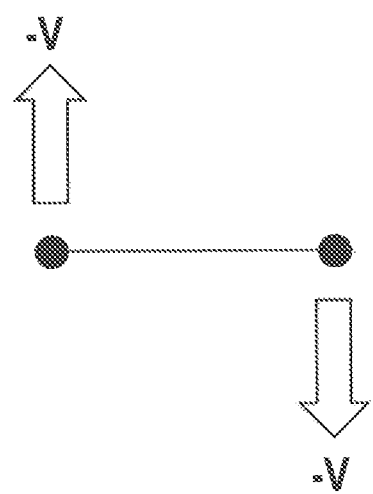
FIG. 10B is an illustration of relative motions of two tracked points on a vehicle occupant's head that may be used to determined roll, pitch and yaw parameters.

FIGS. 9A and 9B, respectively, show extended versions of the head position process of FIG. 8A and the find world position process of FIG. 8B. The processes are similar to the more basic counterparts, but in addition to determining head position and velocity from the image and wave sources, it adds time filtering by utilizing an integrated position/velocity HSM and tracker technology to increase the quality of the head position measurements. With reference to FIG. 9B, further features may be added to find world position process 430, such as Doppler, azimuth, and elevation from the wave receiver 228, and optical flow from the image capture assembly 218. In this embodiment, after the HSM is updated using measurements from the camera 220 and wave receiver 228, additional states of the head, such as its orientation, roll, pitch, and yaw, may be tracked and updated using the Doppler velocity, since distinct points of the head 100 may move towards the wave receiver 228, and other parts away, when the driver's head 100 is in rotation (such as shown in FIG. 10). This would create unique range-velocity detection in the pulse-Doppler wave transceiver system.

Although the above disclosure discusses what is currently considered to be a variety of useful examples, it is to be understood that such detail is solely therefore to be considered in all respects illustrative, and that the appended claims are not limited to the disclosed examples, but, on the contrary, are intended to cover modifications and equivalent arrangements that are within the spirit and scope of the appended claims.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. In a motor vehicle having an occupant, a vehicle occupant head positioning system comprising:
   wave sensing assembly comprising at least one transmitter for transmitting waves towards a head of an occupant in the vehicle, and at least one receiver for receiving waves reflected off the occupant head;
   image capture assembly comprising at least one camera directed at the occupant head for capturing images, and at least one light emitting device for illuminating the occupant head when the images are being captured; and
   one or more sensor fusion processor(s) configured to
      process the waves received by the at least one receiver to compute the radial range with respect to the at least one receiver,
      process the images captured by the at least one camera to determine an image position of the occupant head, and
      determine from the radial range and the image position a three dimensional position of the occupant head by:
      providing a head state model of a positional state of the occupant head;
      determining a fused range based on the radial range and a range determined from frame-to-frame changes in image coordinates in the images captured by the image capture assembly;
      converting the fused range and image coordinates of the captured images to three dimensional coordinates based on corresponding focal length(s) of the at least one camera;
      determining a best match between the head state model and the three dimensional coordinates; and
      updating the head state model with the three dimensional coordinates and an occupant head track position predicted by the head state model.

2. The vehicle occupant head positioning system of claim 1, wherein the wave sensing assembly transmits and receives radar or ultrasonic waves.

3. The vehicle occupant head positioning system of claim 1, further comprising corresponding attachment mechanisms for fixably securing the wave sensor assembly and image capture assembly to the vehicle.

4. The vehicle occupant head positioning system of claim 1, further comprising a driver monitoring system configured to receive the three dimensional position output from the sensor fusion assembly.

5. The vehicle occupant head positioning system of claim 4, wherein the driver monitoring system includes functionality selected from drowsiness estimation and alert, driver inattention to traffic alert, driver gaze direction estimation, driver gaze position estimation, driver identification, head-up display adjustment, and automatic sun-blocking.

6. The vehicle occupant head positioning system of claim 1, wherein the at least one illuminating element emits infrared light.

7. The vehicle occupant head positioning system of claim 6, wherein the at least one camera detects infrared light.

8. The vehicle occupant head positioning system of claim 1, wherein the wave sensor assembly computes at least one of azimuth or elevation of the occupant head.

9. The vehicle occupant head positioning system of claim 1, wherein supplemental measurements, in the form of optical flow from the image capture assembly, are used to feed a time filtering component to improve the accuracy or reliability of the position or velocity estimation.

10. The vehicle occupant head positioning system of claim 1, wherein supplemental measurements, in the form of Doppler information from the wave sensing assembly are used to feed a time filtering component to improve the accuracy or reliability of the position or velocity estimation.

* * * * *